Feb. 14, 1956     A. J. COSTICK ET AL     2,734,227

MOLD STRUCTURE

Filed June 9, 1951

*INVENTOR.*
ANDREW J. COSTICK
BY   WALTER A. JONES

*R. L. Miller*
ATTORNEY

United States Patent Office 2,734,227
Patented Feb. 14, 1956

2,734,227

MOLD STRUCTURE

Andrew J. Costick, Atwater, and Walter A. Jones, Akron, Ohio, assignors, by mesne assignments, to The Goodyear Tire & Rubber Company, a corporation of Ohio Application June 9, 1951, Serial No. 230,766

7 Claims. (Cl. 18—39)

This invention relates to molds and particularly to molds for molding pillows, cushions, mattresses, sponges, or other forms of articles used for cushioning or other purposes for which foamed latex or other plastic, porous, or cellular material may be used. Such material requires heat but no pressure on the material during the vulcanizing or molding process.

Previous molds for curing material of this nature comprised a mold body having cavities formed therein into which material to be molded was poured. A cover was placed over the material in said cavities and the mold subjected to heat to cure the material. This permitted the material being molded to overflow into the register between the lid or cover and the mold to form a fin or rind about the upper edge of articles being molded. This required removal by trimming when the article was removed from the mold, thus making an extra step in the manufacture of the various articles.

An object of the present invention is to eliminate the trimming of the articles after being removed from the mold by providing a mold, the cover of which is provided with a resilient deformable means which seals the register of the mold and cover and by its deformable action wipes and removes the excess material from the register and surfaces adjacent thereto.

Another object is to provide a smooth, even edge to the molded article which will present a more neat and attractive appearance.

The aforesaid objects and other objects which will become more apparent as the description proceeds are achieved by providing a mold composed of a body having one or more cavities therein and a cover or lid to enclose the cavities. The lid has a groove formed in its lower side in which is secured resilient deformable sealing members which rest upon the top surface of the mold closely adjacent the perimeter of the mold cavities when the cover is placed in position over the mold body. The weight of the cover deforms the sealing member laterally, thus creating a wiping and sealing action at the register of the mold and lid. This cleans the mold and cover surfaces adjacent the register and prevents the formation of rinds on the edges of the article being molded.

For a better understanding of the invention reference should be had to the accompanying drawings wherein, Figure 1 is a plan view of the mold with the cover in place;

Figure 1:
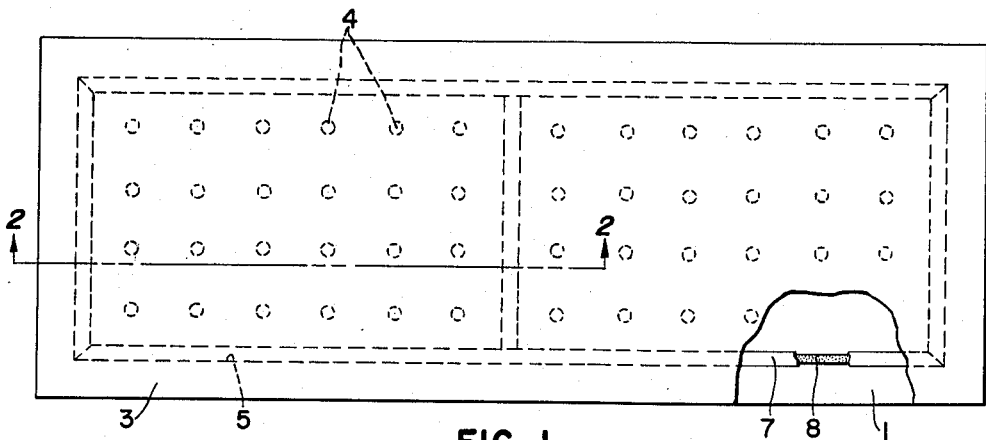
Figure 2:
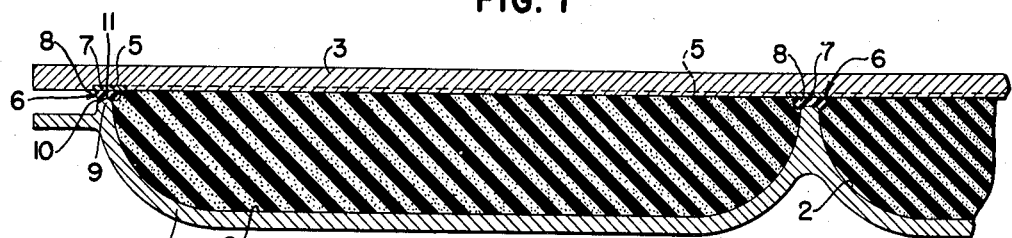
Figure 2 is a sectional view taken on the line 2—2 of Figure 1.

Referring to the drawings, the numeral 1 designates the mold body in which cavities 2 are formed. The mold cover 3 is in the form of a metal plate having core pins 4 secured on its under surface. These pins project into the foamed latex to form cored openings in systematic formation to provide the proper cushioning effect to the article being molded. The cover plate 3 also has grooves 5 formed in its under surface in which sealing and cleaning members indicated generally by the numeral 6 are secured. The sealing and cleaning members 6 are composed of metal strips 7 to which are attached resilient deformable strips 8 composed of rubber or other resilient deformable material which are vulcanized or otherwise secured to the metal strips 7.

The metal strips 7, with the resilient deformable strips 8 attached, are inserted in the grooves 5 in the mold and the edges of the grooves peened sufficiently to retain the sealing member in the groove but not to the extent that they cannot be readily removed for replacement.

Figure 3:
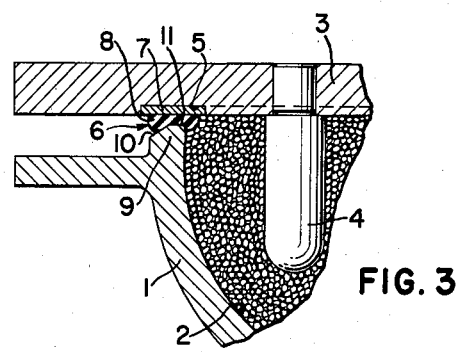
Figure 3 is an enlarged framentary sectional view of the mold in closed position.

The resilient deformable strip 8 may be of different forms, depending upon the form of surface they are required to contact. In Figures 1–4 the mold 1 has an upwardly extending portion 9 which is beveled on the outer edge as at 10 to form a relatively narrow surface 11 for contact with the resilient cleaning and sealing strip 8. As best illustrated in Figure 3, when the cover is in place, the space taken up by the core pins 4 and expansion caused by the heat that is applied to the mold causes the material being molded to expand and overflow into the register between the mold 1 and the cover 3.

When the resilient strip 8 contacts the surface 11 of the mold 1 the strip 8 deforms and flows laterally beyond the initial point of contact with the mold surface 11 and the cover 3. This flowing of the resilient strip across and adjacent the register of the mold and cover creates a wiping and sealing action which seals the register between the mold and cover and cleans the surfaces adjacent thereto and also prevents the forming of rinds on the article being molded to eliminate trimming after the article has been removed from the mold.

Figure 5:
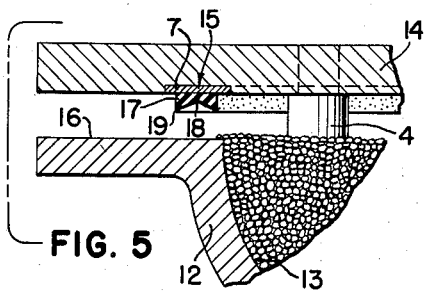
Figure 5 is an enlarged framentary sectional view of the mold in open position showing a modified form of sealing member.
Figure 6:
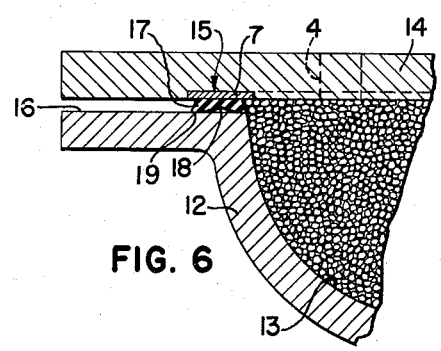
Figure 6 is an enlarged fragmentary sectional view with the modified form of cleaning and sealing member with the mold closed.
Figure 4:
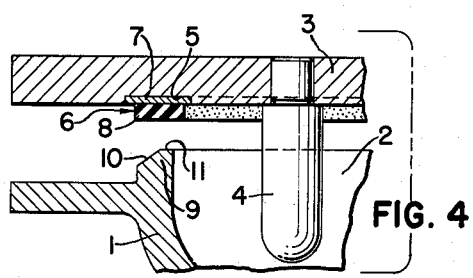
Figure 4 is an enlarged fragmentary sectional view showing the mold in open position.

A different form of mold and sealing member is illustrated in Figures 5 and 6. In this embodiment the mold 12 is of the same general form, having cavities 13, a cover 14, and a trimming member generally indicated by the numeral 15. The mold presents a flat broad surface 16 for contact with the resilient sealing and trimming strip 17 which has an inverted V-shaped longitudinal groove 18 formed in its under surface to form pointed lips 19 on the under surface at either side.

When the mold cover 14 is positioned over the mold 12, the pointed lips 19 make initial contact with the surface 16 of the mold body 1. The weight of the cover deforms the resilient strip 17 laterally causing the lips 19 to slide along the mold surface 16, thus wiping and cleaning any overflow material present and then sealing the register between the mold body and cover to prevent rinds forming on the article being molded, thereby eliminating the operation of trimming.

From the foregoing it will be apparent that providing a mold with a self-cleaning and trimming element incorporated therein, as disclosed, a substantial saving in time and labor will be gained which will be reflected in the cost of producing articles of latex or other plastic cellular material.

This is especially true in the manufacture of articles requiring cored openings to provide the proper cushioning effect in articles such as pillows, mattresses, etc. Such articles are molded in halves to form cored openings and previously it was necessary to trim both halves before they were joined together by cementing to form a unitary article. This trimming is entirely eliminated by the present invention, resulting in a saving of time and a more attractive product.

While certain representative embodiments and details have been shown for the purpose of illustrating the invention, it will be apparent to those skilled in this art that various changes and modifications may be made therein without departing from the spirit or scope of the invention.

We claim:

1. A mold for molding articles of porous plastic material comprising a mold body having cavities formed therein to receive the material to be molded and a contacting surface adjacent the peripherial edge of said cavities, a cover to enclose said cavities, said cover having a deformable resilient strip secured thereto coextensive with the contacting surface of the mold, said strip having a contacting surface which engages the contacting surface of the mold, a portion of the contacting surface of the strip and a portion of the contacting surface of the mold being substantially inclined in transverse cross section relative to each other at the time of initial contact so that initial pressure of the cover when placed on the mold causes the contacting surface of said strip to slide transversely across the contacting surface of the mold and thus wipe plastic material from the mold contacting surface, whereby rinds are prevented from forming on the molded article.

2. A mold for molding articles of porous plastic material comprising a mold body having cavities formed therein to receive the material to be molded and a contacting surface adjacent the peripherial edge of said cavities, a cover to enclose said cavities, said cover being provided with grooves which are coextensive with the mold contacting surfaces when the cover is in place over said cavities, metallic strips secured in the grooves, a deformable resilient strip secured to each of said metallic strips having a contacting surface which engages the contacting surface of the mold, a portion of the contacting surface of the resilient strips and a portion of the contacting surface of the mold being substantially inclined in transverse cross section relative to each other at the time of initial contact so that initial pressure of the cover when placed on the mold causes the contacting surface of said strip to slide transversely across the contacting surface of the mold and thus wipe plastic material from the mold-contacting surface, whereby rinds are prevented from forming on the molded article.

3. A mold for molding articles of porous plastic material comprising a mold body having cavities formed therein to receive the material to be molded and a contacting surface adjacent the peripherial edge of said cavities, a cover to enclose said cavities, said cover having a deformable resilient strip secured thereto, said strip having a contacting surface coextensive with the contacting surfaces of the mold, one of said contacting surfaces being flat and the other contacting surface being angularly disposed in transverse cross section relative to said flat surface at the time of initial contact so that initial pressure of the cover when placed on the mold causes the contacting surfaces to slide transversely across each other and thus wipe plastic material from the mold-contacting surface, whereby rinds are prevented from forming on the molded article.

4. A mold for molding articles of porous plastic material comprising a mold body having cavities formed therein to receive the material to be molded and a contacting surface adjacent the peripherial edge of said cavities, a cover to enclose said cavities, said cover having a deformable resilient strip secured thereto, said strip having a contacting surface coextensive with the contacting surface of the mold, one of said contacting surfaces being flat and the other of said contacting surfaces having a pair of faces, said faces being angularly disposed in transverse cross section relative to each other immediately prior to initial contact of said surfaces whereby plastic material is wiped from the mold-contacting surface as the mold is closed to prevent rind from forming on the molded article.

5. A mold for molding articles of plastic cellular material comprising a mold body having cavities formed therein to receive the material to be molded, said body having flat contacting surfaces adjacent the periphery of said cavities, a cover to enclose the material in the cavities, a resilient deformable strip secured to said cover and having a contacting surface coextensive with the contacting surface of the mold, said strip contacting surface being inclined in transverse cross section relative to the flat mold body contacting surface immediately prior to initial contact of said surfaces and thus wipe plastic material from the mold-contacting surface, whereby rinds are prevented from forming on the molded article.

6. A mold for molding articles of plastic cellular material comprising a mold body having cavities formed therein to receive the material to be molded, said body having flat contacting surfaces adjacent the periphery of said cavities, a cover to enclose the material in the cavities, a resilient deformable strip secured to said cover and having a contacting surface coextensive with the contacting surface of the mold, said strip contacting surface having a pair of faces angularly disposed in transverse cross section relative to each other immediately prior to initial contact of said surfaces whereby plastic material is wiped from the mold-contacting surface as the mold is closed to prevent rind from forming on the molded article.

7. A mold for molding articles of plastic cellular material comprising a mold body having cavities formed therein to receive the material to be molded, said body having flat contacting surfaces adjacent periphery of said cavities, a cover to enclose the material in the cavities, a resilient deformable strip secured to said cover and having a contacting surface coextensive with the contacting surface of the mold, said strip contacting surface having sidewalls projecting vertically from said cover and a longitudinal groove, V-shaped in cross section, formed in the contacting surface of said resilient deformable strip whereby plastic material is wiped from the mold-contacting surface as the mold is closed to prevent rinds from forming on the molded article.

References Cited in the file of this patent

UNITED STATES PATENTS

| 2,203,543 | Pancorbo | June 4, 1940 |
| 2,248,060 | Brundage | July 8, 1941 |
| 2,288,263 | Bostwick | June 30, 1942 |
| 2,298,223 | Miller | Oct. 6, 1942 |
| 2,314,176 | Talalay | Mar. 16, 1943 |
| 2,326,381 | Milligan et al. | Aug. 10, 1943 |
| 2,516,191 | Englesson | July 25, 1950 |
| 2,595,964 | Lovell | May 6, 1952 |

FOREIGN PATENTS

| 10,171 | Great Britain | 1892 |
| 605,978 | Great Britain | Aug. 4, 1948 |